United States Patent [19]

Kishi et al.

[11] 4,163,284
[45] Jul. 31, 1979

[54] NC TAPE PRODUCING SYSTEM

[75] Inventors: Hajimu Kishi; Naganori Miyoshi; Masaki Seki, all of Tokyo, Japan

[73] Assignee: Oki Electric Industry Co., Ltd., Tokyo, Japan

[21] Appl. No.: 832,643

[22] Filed: Sep. 12, 1977

[30] Foreign Application Priority Data

Sep. 10, 1976 [JP] Japan .................................. 51-107923

[51] Int. Cl.$^2$ ........................ G05B 19/42; G06F 15/46
[52] U.S. Cl. .................................... 364/474; 318/568; 364/107; 364/120
[58] Field of Search ............... 364/107, 118, 120, 474, 364/300; 318/567, 568, 569, 570

[56] References Cited

U.S. PATENT DOCUMENTS

| | | | |
|---|---|---|---|
| 3,624,371 | 11/1971 | Neal et al. | 318/568 X |
| 3,629,558 | 12/1971 | Coggin | 318/568 X |
| 3,739,157 | 6/1973 | Bobrowicz et al. | 318/568 X |
| 4,010,356 | 3/1977 | Evans et al. | 318/568 X |
| 4,042,866 | 8/1977 | Morita et al. | 318/568 |

*Primary Examiner*—Joseph F. Ruggiero
*Attorney, Agent, or Firm*—Armstrong, Nikaido, Marmelstein & Kubovick

[57] ABSTRACT

A program for operating a numerical control machine tool written in problem oriented language is translated into machine oriented language through the use of the present NC tape producing system. The present system has a mini-computer mounted in a desk type cabinet, which has also a printer, an input tape reader, an output tape puncher, a key board, and a mini-board panel, each connected to said mini-computer. The mini-board panel is covered with the mini-board sheet indicating the roles of keys under the mini-board sheet. The system is automatically initialized just by turning on a power switch, or pushing a load key, and the program for operating the mini-computer itself is automatically loaded in the memory of the mini-computer through said input tape reader. Thus, the operation of the system is very easy. A problem oriented source program is applied to the system through the input tape reader, translated by the mini-computer to a machine language program, which is in turn obtained from said output tape puncher.

5 Claims, 12 Drawing Figures

NC TAPE PRODUCING SYSTEM

BACKGROUND OF THE INVENTION

The present invention relates to an NC tape producing system, in which an operator can make an NC tape by simple operation of a mini-computer.

NC (Numerical Control) machine tools operate with a NC program, which is realized on a paper tape, magnetic disk, magnetic tape, and/or other information storage medium. An NC program which operates an NC machine tool is in a machine language, which is very difficult for man to understand. Therefore, automatic programming in which a man writes a program in a problem oriented language which is automatically translated to an NC program in machine language, is conveniently utilized. A program in a problem oriented language is sometimes called a source program. In an automatic programming, an appropriately programmed computer translates a source language program to a machine language program which can control an NC machine tool.

However, a prior automatic programming system has the following disadvantages.

First, according to a prior automatic programming system, the operation of a computer is very difficult for an NC machine operator. Since a prior computer system has a complicated operating system, a person who operates the computer system must exercise the operating system of the particular computer. In order to solve the above problem, some approaches have been done by using a mini-computer and/or time-sharing computer system. However, those approaches can not completely solve the problem that the operation of a computer system is difficult.

Secondly, an NC program must also be debugged to remove the errors of a program. When an NC program is changed by a debugging, a translation from a source language to a machine language must be accomplished again. Since the debugging occurs very often, the translation must also be accomplished very often. As the operation of a prior computer system is complicated, the debugging is also complicated and is time consuming.

SUMMARY OF THE INVENTION

It is an object, therefore, of the present invention to overcome the disadvantages and limitations of a prior art by providing a new and improved NC tape producing system.

Another object of the present invention is to provide an NC tape producing system having a mini-computer, in which operation of the same is very easy and an operator can operate the present system with almost no knowledge of the nature of a computer.

The above and other objects are attained by an NC tape producing system comprising a desk type cabinet having a top board and a leg portion supporting the same, a general purpose digital processor together with a memory and an initial program loader stored in a read-only memory mounted in said leg portion, said top board having a printer, a key board panel, a tape input unit, and a tape output unit each connected to said processor, said key board panel having a key board with a plurality of character keys, a plurality of auxiliary switches, a power switch and a mini-board panel, said mini-board panel having a plurality of guidance lamps, instruction keys and function keys, and a mini-board sheet with a plurality of holes for covering said mini-board panel to indicate the roles of each keys.

BRIEF DESCRIPTION OF THE DRAWINGS

The foregoing and other objects, features, and attendant advantages of the present invention will be appreciated as the same become better understood by means of the following description and accompanying drawings wherein.

DESCRIPTION OF THE PREFERRED EMBODIMENTS

Figure 1:
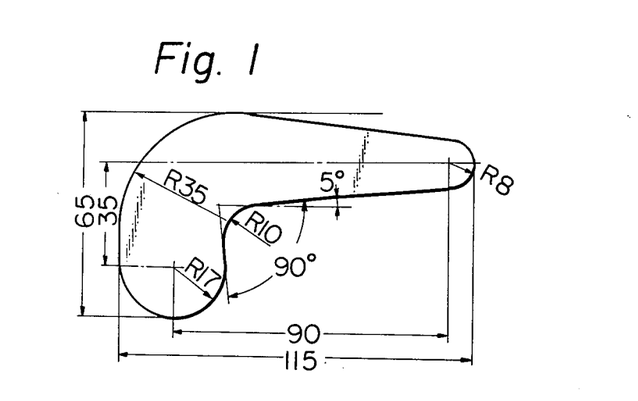
FIG. 1 shows an example of the profile of a work to be cut by an NC machine tool.

For example, the profile shown in FIG. 1 is to be cut in a mill, the program shown in table 1 which is in a problem oriented language is prepared, and said program is translated to an NC program which is in a machine oriented language shown in table 2. The program in table 2 is applied to an NC machine tool to cut a raw material. The problem oriented program shown in table 1 is sometimes called a part program, and includes at least a definition statement, control statement and cutting statement. In the translation from a problem oriented language to a machine oriented language, not only a translation of each statement but also the calculation of the coordinates of each points and the compensation according to the size of a bit is automatically accomplished.

Table 1

| (PART) |
|---|
| PNQ/761115 COSTA HUB |
| MCH/2 |
| LQ = L/0, 65, 1, 65 |
| R1 = C/17, 17, 17 |
| L1 = L/0, 0, 0, 1 |
| R2 = C/35, 30, 35 |
| R3 = C/107, 52, 8 |
| L2 = L/LT, R2, LT, R3 |
| P3 = P/R3 |
| L5 = L/P3, 5, LQ |
| L3 = L/L5, YS, 8 |
| P1 = P/R1 |
| L6 = L/P1, 5, L1 |
| L4 = L/L6, XL, 17 |
| CT/20 |
| CL/ON |
| SP/ON |
| FRM/0, 0, 100 |

Table 1-continued (PART)

```
RP
GD/-10, 0, 0
RP
GO/PS, LQ, T0, L1
RP
GD/0, 0, -100
FD/100
TL, MV/GR, LQ, GF, R2, L2, R3, GL, L4, GF, R1,
    L1, R2, TT, LQ
GD/10, 0, 0
RP
GD/0, 0, 100
RP
GT/0, 0, 100
SP/OFF
CL/OFF
REW
FIN
```

Table 2

(NC Tape)

```
%
N001G90
N002M08
N003G00X-10000
N004Y75000
N005Z0
N006G01X35000F100
N007G02X38159Y74889I0J-45000F100
N008G01X108264Y69956F100
N009G02X108569Y34069I-1264J-17956F100
N010G01X43111Y28342F100
N011X43897Y19353
N012G02X-10000Y17000I-26897J-2353F100
N013G01Y30000F100
N014G02X35000Y75000I45000J0F100
N015G01X45000F100
N016G00Z100000
N017X0Y0
N018M05
N019M09
N020M30
%
```

Although the part program in the table 1 is longer than the NC program in the table 2, a part program is generally shorter than an NC program.

Figure 2:
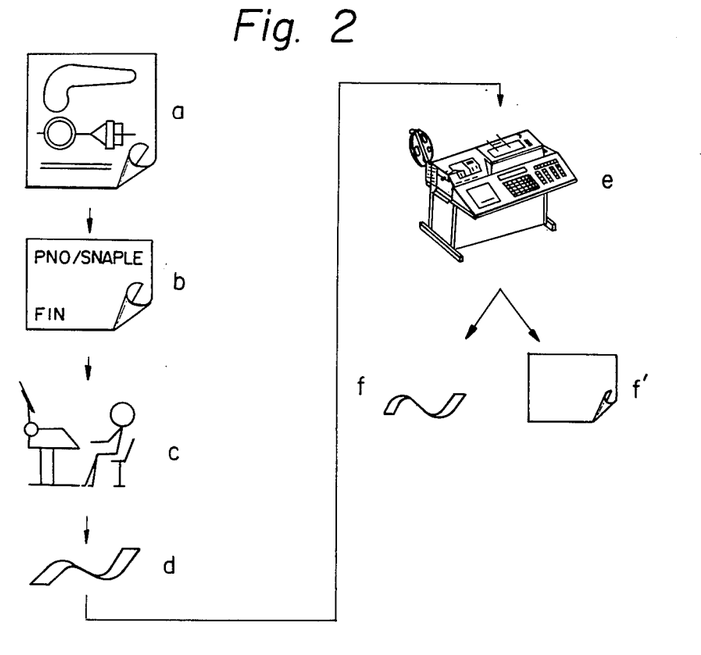
FIG. 2 shows the flow diagram for producing an NC tape according to the present invention.

FIG. 2 shows the process for producing an NC program tape. First, a machine designer makes a drawing (step a), then a programmer writes a part program in a problem oriented language according to the drawings in step (a), (step b). Next, a tape puncher makes a tape having the information of a part program (step c), (step d). In the step (e), the NC tape producing unit according to the present invention translates said part program to an NC tape in a machine language (step f). The NC tape producing unit can also produce a printed list of an NC program (step f').

Figure 3:
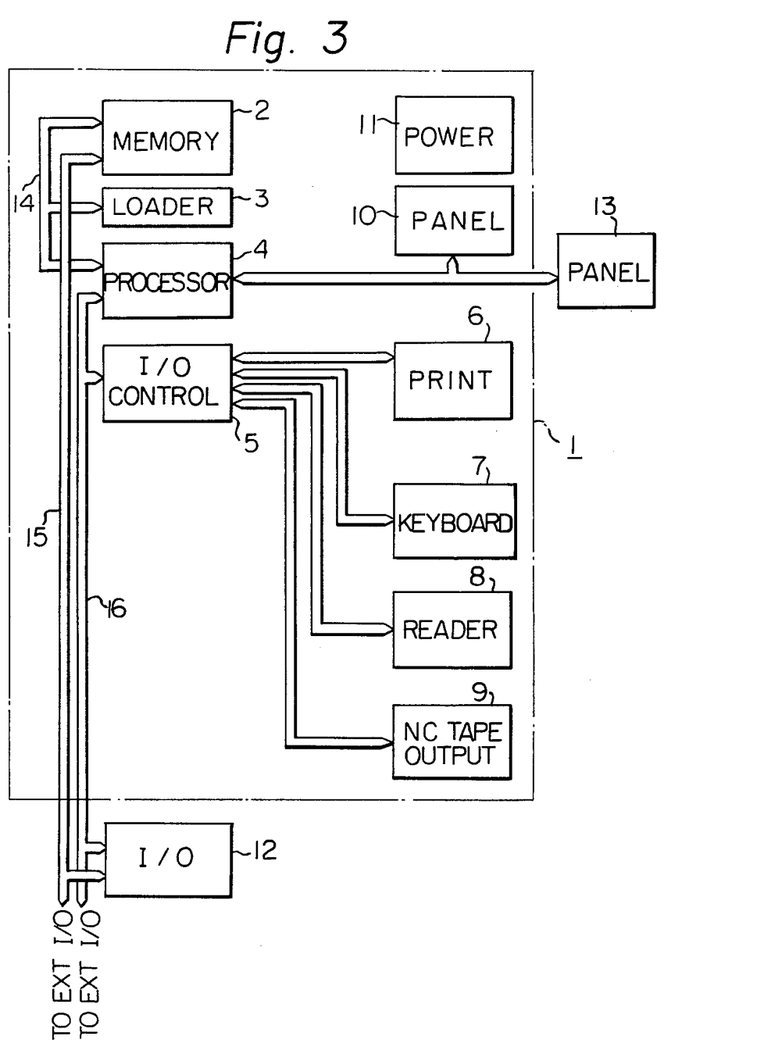
FIG. 3 is the electrical block-diagram of the NC tape producing system according to the present invention.

FIG. 3 shows the electrical block-diagram of the NC tape producing system 1 according to the present invention. In the drawing, the reference numeral 2 is a main memory, 3 is an initial program loader stored in a read-only-memory (ROM). 4 is a processor which is realized by a commercial general purpose mini-computer. The Okitac 4300B mini-computer manufactured by Oki Electric Co, Tokyo Japan can be utilized for the processor 4. 5 is an input/output control unit, 6 is a printer, 7 is a keyboard panel, 8 is an information reader, 9 is an NC tape output unit, 10 is a maintenance panel, 11 is a power supply unit, 12 is an input/output device to and from a processor 4 such as a drawing machine, magnetic disk, a cassette magnetic tape unit, a floppy disk unit, a high speed paper tape reader, a high speed paper tape puncher, a line printer and so on. 13 is an operation panel of the processor 4. It should be appreciated that all the units enclosed in the dotted line 1 are installed in a single housing. 14 is a memory bus line, 16 is a program bus line.

Figure 4A:
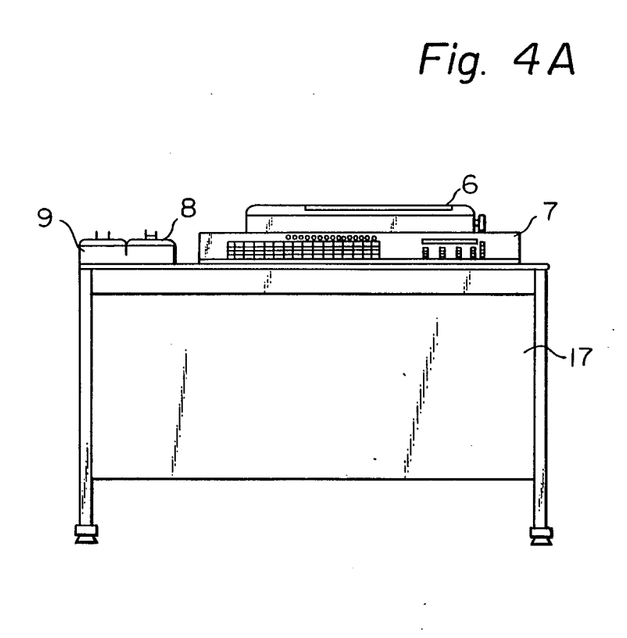
FIG. 4(A) and FIG. 4(B) show the mechanical outlook of the NC tape producing system according to the present invention.
Figure 4B:
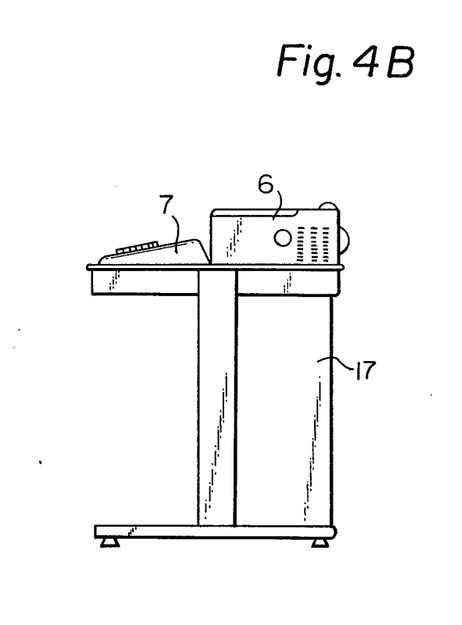

FIG. 4(A) and FIG. 4(B) show the front view and the side view of the present NC tape producing system. As apparent from the above drawings, the present NC tape producing system is in a desk shape, and on the top board, the printer 6, the keyboard panel 7, the tape reader 8 and the NC tape output unit 9 are installed. The top board is supported by the leg portion 17. The leg portion 17 functions as a housing for securing the main memory 2, the initial program loader 3, the processor 4, the input/output control unit 5, the maintenance panel 10 and the power supply unit 11.

Figure 5:
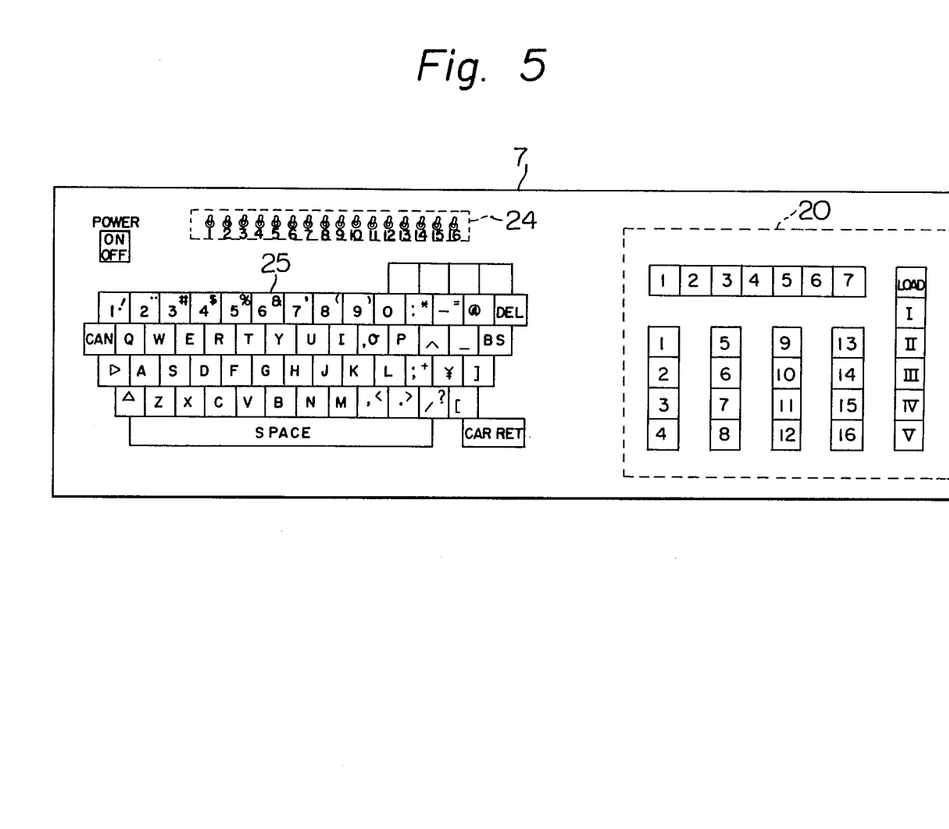
FIG. 5 shows the keyboard panel of the NC tape producing system according to the present invention.

FIG. 5 shows the arrangement of the keyboard panel 7 which is connected through the input/output control unit 5 to the processor 4. The keyboard panel 7 has a plurality of auxiliary switches 24, a plurality of character keys 25, a power switch, and the mini-board panel 20.

Figure 6:
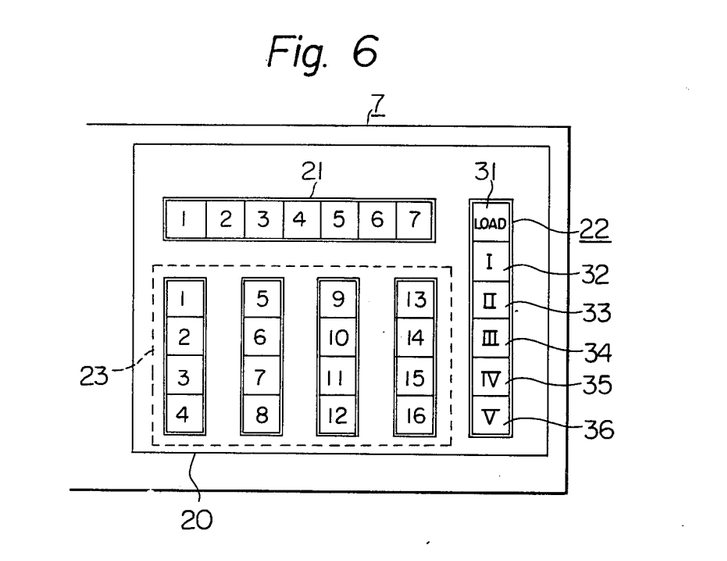
FIG. 6 is an enlarged view of the mini-board 20 in FIG. 5.

FIG. 6 shows the mini-board panel 20, which has a plurality of guidance lamps 21, a plurality of instruction keys 22, and a plurality of function keys 23. Each of said function keys 23 is a hold type switch which, when pushed, remains engaged until pushed again.

It should be appreciated that the present NC tape producing system has a stored-program type processor and a main memory for operating the same. The main memory stores necessary programs like language processing program, data plotter program, an editor program and so on. One of the programs stored in the main memory is selected by the information from the keyboard. The auxiliary information necessary for performing the selected program can be obtained from the auxiliary switches 24 and the mini-board panel 20. Further, according to the present invention, the loading of the necessary programs in the main memory can be accomplished very easily.

Now, the mini-board panel 20 will be explained in detail with reference to the FIGS. 6, 7, 8 and 9. A plurality of guidance lamps 21 of the mini-board panel 20 are turned on or off by the instruction of the program being performed by the processor 4. Seven lamps are installed in the present embodiment. The condition of said lamps indicates the operational condition of the present NC tape producing system.

It is supposed that the processor 4 has an arithmetic register (AR) which has sixteen bit positions, although the detailed block-diagram of the processor 4 is not shown, as the processor 4 is an ordinary digital computer and the structure of the processor is not the object of the present invention.

Figure 7:
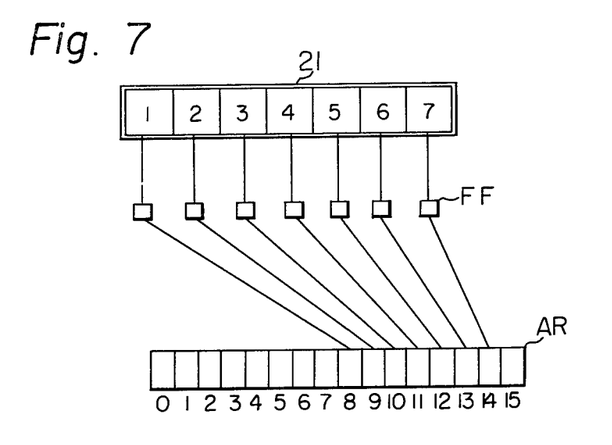
FIG. 7 is the electrical configuration of the lamps 21 in FIG. 6.

Each of the guidance lamps 21 is connected to the corresponding bits of the arithmetic register (AR) through the corresponding flip-flops (FF), as shown in FIG. 7. Accordingly, the bit pattern in the register (AR) set by the program for the processor 4 is transferred to the lamps 21, thus each of the lamps 21 is turned on or off by the operation of the program of the processor 4. The condition of the lamp 21 indicates to the operator the condition of the present NC tape producing system.

Figure 8:
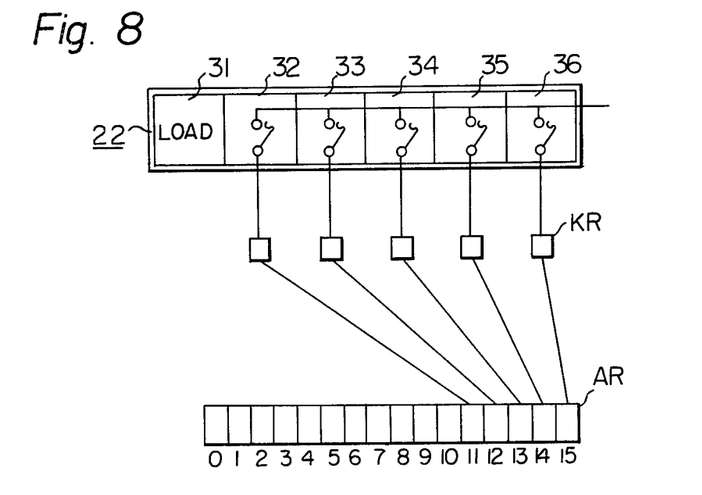
FIG. 8 shows the electrical configuration of the interruption switches 22 in FIG. 6.

The instruction key 22 has the load key 31 and five interruption keys 32 through 36. The present NC tape producing system is initialized by pushing the load key 31, and then the processor 4 performs the program beginning the start address of the initial program loader 3. Said effect of the load key 31 can also be performed by pushing the power switch. Each of the interruption keys 32 through 36 interrupts the operation of the processor 4. Of course, the processor 4 can specify which one of the keys 32 through 36 is pushed. That is to say, the interruption keys 32 through 36 are connected to the register (AR) through the interruption key register (KR) as shown in FIG. 8. And when the processor 4 performs the "Interruption Read" instruction, the status of the switches 32 through 36 is read in the register (AR), thus, the processor 4 can differentiate the pushed switch of switches 32 through 36, and understand the operator's instructions.

The function key 23 has sixteen switches each having a lamp for indicating the status of the switch. Said function key 23 is a hold type switch which changes the status every time it is pushed, and when the switch is ON, the lamp of the switch is on and when the switch is OFF, the lamp on the switch is off. The function key 23 can thus hold sixteen statuses, which are read by the register (AR) of the processor 4 when the processor 4 performs the "Function Key Read" instruction.

The auxiliary switch 24 in FIG. 5 has sixteen switches, the statuses of which are read in the register (AR) of the processor 4 when the processor 4 performs the "Auxiliary Switch Read" instruction. Each of the auxiliary switches 24 operates as follows. The switches 1 through 3 give the information concerning the loading of a system program, and the switch 1 indicates the memory storing the system program. That is to say, the ON status of the switch 1 indicates that the system program is stored in a core memory and the OFF status of the same indicates that the system program is stored in an IC memory. The switch 2 designates the input medium, the ON status indicates a paper tape, and the OFF status indicates a magnetic recording medium. The switch 3 indicates an input apparatus. When the switch 2 is ON, and the switch 3 is also ON, a mechanical paper tape reader is selected. When the switch 2 is ON and the switch 3 is OFF, a photo tape reader is selected. When the switch 2 is OFF and the switch 3 is ON, a magnetic cassette tape is selected. When both the switches 2 and 3 are OFF a magnetic floppy disk is selected.

When the present apparatus is utilized as an electro-printer, the switches 4 through 6 designate the input and output apparatuses. That is to say, when the switch 4 in ON, a mechanical paper tape reader is selected as an input apparatus, and when the switch 4 is OFF, a photo tape reader is selected as an input apparatus. The switch 5 designates a tape puncher as an output apparatus, and when the switch 5 in ON, a low speed paper tape puncher is selected and when the switch 5 is OFF, a high speed tape puncher is selected. The switch 6 designates a printer as an output apparatus, and when the switch 6 is ON, an electro-typewriter is selected as a printer and when the switch 6 is OFF, a line printer is selected as an output printer.

When the present apparatus is utilized as an automatic NC tape producer, the switches 7 through 9 designate the input and output apparatuses. When the switch 7 is ON, a mechanical tape reader is selected as an input apparatus of a part program (a source program). When the switch 7 is OFF, a photo tape reader is selected as an input apparatus of a part program. When the switch 8 is ON, a low speed tape puncher is selected as an output apparatus of an NC tape, and when the switch 8 is OFF, a high speed tape puncher is selected as an output apparatus of an NC tape. And, when the switch 9 is ON, an electro-typeprinter prints a hard copy of an NC tape, and when the switch 9 is OFF, a line printer prints a hard copy of a NC tape.

The switches 10 through 16 are not used.

The designation of the auxiliary switch 24 (1–16) is summarized in the table below.

| SW-NO | Function (1) | Function (2) | ON | OFF |
| --- | --- | --- | --- | --- |
| 1 | Loading System Program | memory | Core memory | I/C memory |
| 2 | | Input medium | Paper tape | Magnetic medium |
| 3 | | Input apparatus | mechanical paper tape reader (SW2 = ON) magnetic cassette Tape (SW2 = OFF) | Photo tape reader (SW2 = ON) a floppy disk (SW2 = OFF) |
| 4 | Electro-Printer | Input apparatus | Mechanical paper tape reader | Photo tape reader |
| 5 | | Output apparatus | Low speed paper tape puncher | High speed paper tape puncher |
| 6 | | Printer | Electro-printer | Line-printer |
| 7 | NC-tape producer | Input apparatus | Mechanical paper tape reader | Photo tape reader |
| 8 | | Output apparatus | Low speed paper tape puncher | High speed paper tape puncher |
| 9 | | Printer | Electro-printer | Line-printer |
| 10–16 | Not used | | | |

It should be appreciated that the auxiliary switch 24 (1–16) is not frequently changed after the present NC tape producing system is established. Therefore, the auxiliary switch 24 is usually covered.

Figure 9:
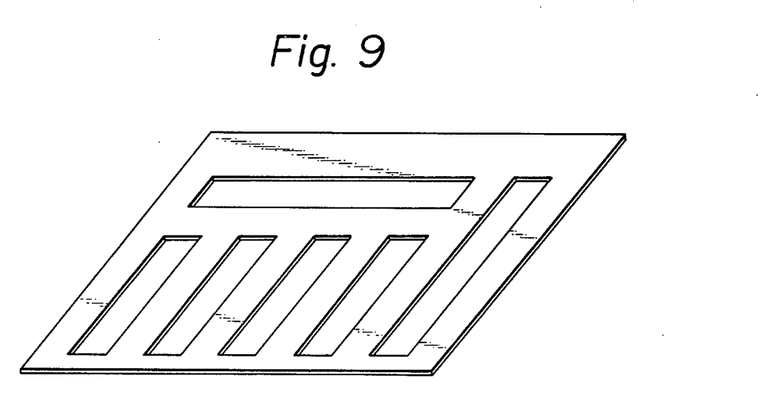
FIG. 9 shows the structure of the mini-board sheet according to the present invention.

FIG. 9 shows the structure of the mini-board sheet, which covers the mini-board panel 20. The mini-board sheet has a plurality of rectangular holes for accepting the lamps 21, the instruction keys 22 and the hold-type function keys 23, as shown in FIG. 9. The mini-board sheet is sufficiently thin, so when the mini-board sheet is put on the mini-board panel, the operation of the instruction keys 22 and the function keys 23 is not disturbed by the presence of the mini-board sheet. On the mini-board sheet, some characters indicating the roles of the switches and lamps covered by the mini-board sheet are printed. Therefore, by changing the mini-board sheet, the function of the present apparatus can be changed. Three of the examples of the mini-board sheets are (1) for automatic NC tape producer, (2) for mere electro-typewriter, and (3) for a drawing plotter. Concerning the drawing plotter, the present apparatus can be connected to a drawing plotter to produce a drawing according to the produced NC tape. This facilitates the debugging of an NC tape before the NC tape is used to operate an NC machine tool.

Figure 10:
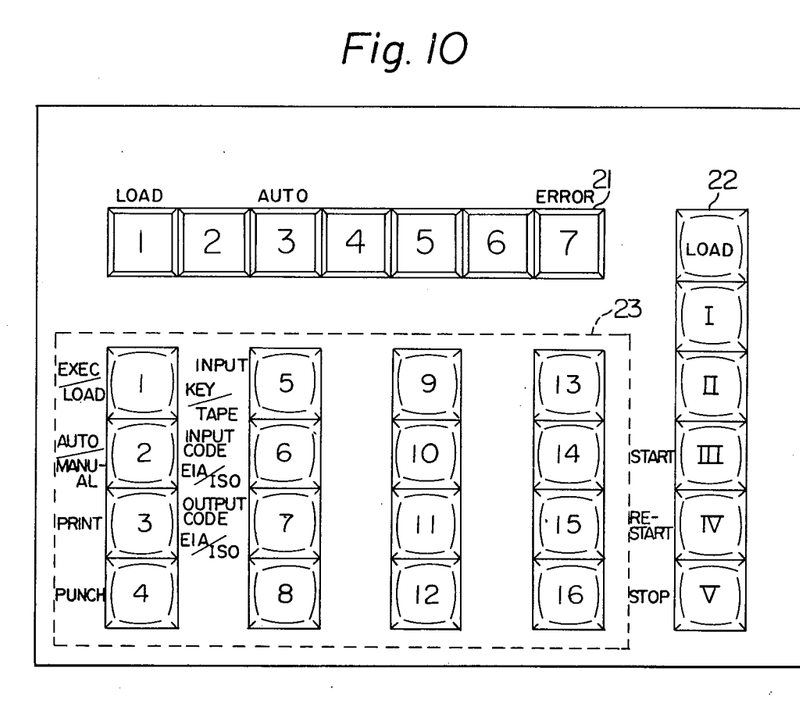
FIG. 10 is the mini-board panel covered with the mini-board sheet.

FIG. 10 shows an example of a mini-board sheet for an automatic NC tape producer. Beside the lamp 1 of the guidance lamps 21, the characters "load" are printed. Therefore, when said lamp 1 is turned on, the present apparatus is loading a system program into the processor memory, that is to say, the present apparatus is in preparation condition. When the lamp 3 (auto) is turned on, the present apparatus is being used for automatic programming, that is to say, the present apparatus is translating the input source program to a machine language NC tape program. When the lamp 7 (error) is turned on, an error (for instance a parity check error) is produced in the present apparatus. Further, the switch "load" on the instruction key 22 indicates the loading of the system program. The switches III, IV and V on the instruction key 22 show "start", "re-start" and "stop", respectively. The hold-type function key 23 indicates the operation according to the status of each switch. The switch 1 (exec/load) indicates to excute a program when the switch 1 is on and to load a program when the switch is off. The switch 3 (print) indicates whether or not to print. The switch 4 (punch) indicates whether or not to punch a paper tape. The switch 5 (input, key/tape) indicates the input medium. The switches 6 and 7 indicate the standard of codes, that is to say, when the switch 6 is on the input code is EIA standard, and when the switch 6 is off the input code is in ISO standard. When the switch 7 is on, the output code is in EIA standard, and when the switch 7 is off, the output code is in ISO standard.

Now, the operation of the present apparatus when automatic NC tape production is performed will be explained below. Since the present apparatus includes the main memory 2, the initial program loader 3 and the processor 4, a program for operating the processor 4 must be loaded in the main memory 2, and further, the program loaded in the memory 2 must be changed according to the function of the present apparatus (automatic NC tape producer drawing plotter etc).

Figure 11:
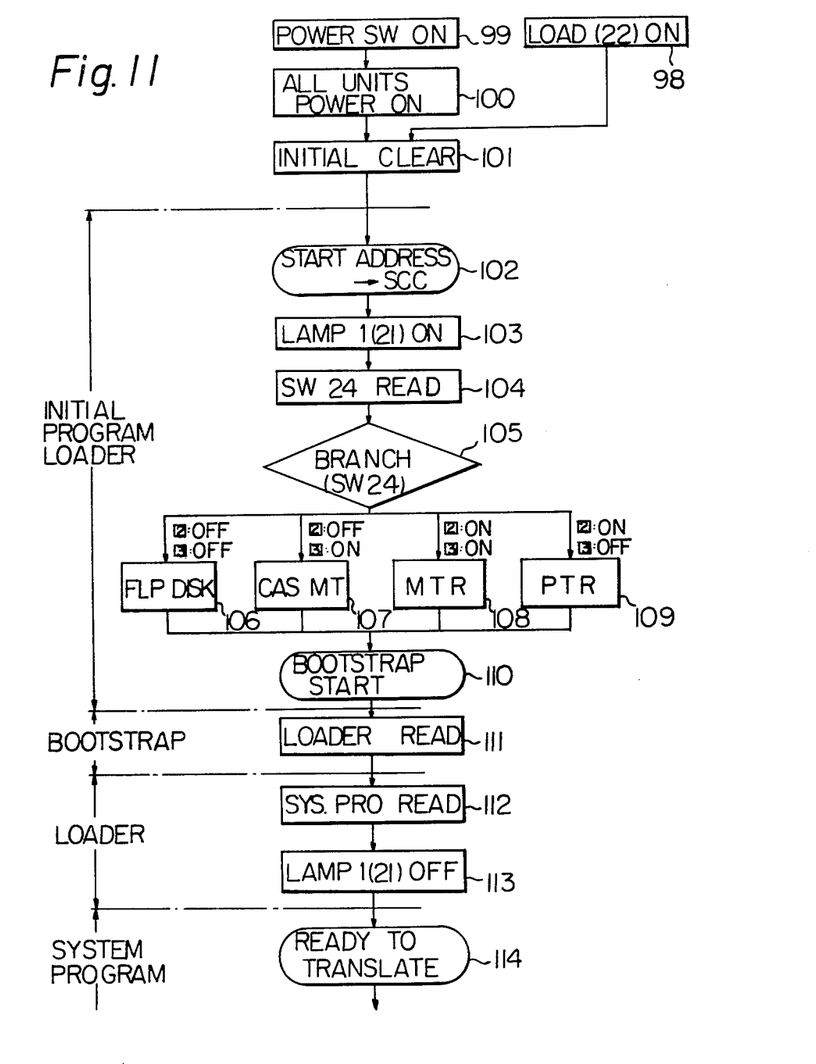
FIG. 11 shows the operational flow diagram of the present NC tape producing system.

First, the operation of the program loading will be explained in accordance with FIG. 11. The switch 1 of the function keys 23 on the mini-board sheet is switched off to designate the program loading. Next, a program medium which stores the system program in either paper tape medium, cassette magnetic tape medium or floppy disk is mounted onto the input apparatus designated by the switch 3 of the auxiliary switches 24. When the power switch (see FIG. 5) is turned on, not only the processor 4 but also all the units connected to the processor 4 are supplied with electric power under the control of the processor 4 (see 99 and 100 in FIG. 11). Next, all the circuits including flip-flops, counters etc in all the units are initialized (see 101 in FIG. 11). When the power switch is already on, the above operation (101 in FIG. 11) is performed by pushing down the load switch ("load" in the instruction key 22), (see 98 in FIG. 11). Next, the start address of the initial program loader is set in the sequence control counter (SCC not shown) of the processor 4 (see 102 in FIG. 11). Since the address to be performed by the processor is shown in the sequence control counter, the processor 4 is ready to perform the initial program at stage 102 in FIG. 11. Next, the lamp 1 of the guidance lamps 21 is turned on (see 103 in FIG. 11), thus the program loading status, is indicated. Next, the processor 4 reads the status of the auxiliary switches 24 (see 104 in FIG. 11) and according to the statuses of the switches 2 and 3 of the auxiliary switches 24 (see 105 in FIG. 11), one of the input apparatuses having a system program is selected. When both the switches 2 and 3 are off, a floppy disk is selected (see 106 in FIG. 11). When the switch 2 is off and the switch 3 is on, a cassette magnetic tape is selected (see 107 in FIG. 11). When both the switches 2 and 3 are off, a mechanical tape reader is selected (see 108 in FIG. 11). And when the switch 2 is on and the switch 3 is off, a photo tape reader is selected (see 109 in FIG. 11).

The program to be loaded in the processor 4 is divided into three portions, a bootstrap, a loader, and a system program. A bootstrap is a simple program used to read a loader and is read in the processor 4 by the initial program loader. A loader can be used to read the system program coded with an assembler language, and the loader is read in the processor 4 by the bootstrap. The system program is the program for the translation of the source program to an NC machine language. So, when an input program is provided by a paper tape, said three programs, bootstrap, loader and system program are punched in sequence on a paper tape. When the initial program loader (which is stored in a read-only memory in the processor 4) finishes reading the bootstrap at the first portion of a paper tape, the execution of the processor 4 jumps to the first address of the bootstrap which is now read in the memory (see 110 in FIG. 11). The bootstrap continues to read the input tape, and reads the loader located after the bootstrap on the input tape (see 111 in FIG. 11). When the loader reading is finished in the memory, the execution address of the processor 4 jumps to the start address of the loader, and the loader starts. The loader continues to read the input tape and reads the system program located after the loader on the input tape. (see 112 in FIG. 11). When the loader finishes reading the system program, the lamp 1 of the guidance lamp 21 is turned off to show that the program loading is finished (see 113 in FIG. 11), and the program execution of the processor 4 jumps to the start address of the system program (see 114 in FIG. 11). At this stage, the present apparatus is ready to translate the source program to an NC machine language program, and the present apparatus waits for the key III "start" of the instruction keys 22 to be pushed.

Next, the operation of the automatic programming will be explained.

In this operation mode, both the function keys 1 and 2 (exec/load, and auto/mannual) of the function keys 23 are turned on. The switch III "start" instructs the processor to start the system program. The system program reads a source program (part program) as shown in the table 1 from the input apparatus designated by the switch 7 of the auxiliary switches 24, and translates the source program to the NC machine language program. The translated NC machine language program is outputed to the tape puncher designated by the switch 8 of the auxiliary switches 24 and to the printer designated by the switch 9 in the auxiliary switch 24. The switches 3, 4, 5, 6 and 7 in the function key 23 control the operation of the system program. The status of the switch 3 "print" determines whether or not to print a hard copy of the NC machine language program. The switch 4 "punch" of the function key 23 determines whether or not to punch a paper tape according to the output of the NC machine language program. The switch 5 "input; key/tape" controls the input apparatus of the source program. According to the status of the switch 5, the source program is provided by the keyboard 25 in FIG. 5, or the source program is provided by the tape reader designated by the switch 7 of the auxiliary switches 24. The switch 6 of the function keys 23 designates the standard code of the input information, and the switch 7 of the function keys 23 designates the standard code of the output information. If an operator wants to stop or re-start the present apparatus during the execution of the system program, the switches IV and V ("re-start") and "stop") can accomplish this.

When an operator want to produce an NC machine language tape manually, instead of translating a source program, he can use the present apparatus as a mere electro-typewriter, in which the switch 2 of the function key 23 is turned off, and another mini-board sheet for the electro-typewriter function covers the mini-board panel. The function of the switches 3 through 7 of the function keys 23 in the manual mode is the same as that in the automatic NC tape producing mode mentioned above.

When an operator wants to debug an NC machine language tape, the present system is switched to the drawing plotting mode, in which the particular mini-board sheet is utilized and a plotter is connected to the processor 4 as a peripheral device of the processor 4. In this mode, by reading an NC machine language tape via the tape input unit to the processor 4, the resultant drawing showing the profile of the work cut by the NC tape is obtained on the drawing plotter. Thus, by watching the drawing on the plotter, an operator can determine whether the NC tape is correct.

It should be appreciated that by pushing down the power switch the apparatus is automatically initialized and the program loading is accomplished.

Now, some of the important effects obtained by the present invention are enumerated below.

(1) As the mini-board panel is provided, an operator can control the apparatus using the mini-board panel without handling the operation panel of the processor (13 in FIG. 3). Therefore, an operator can handle the apparatus without the need for operation of a computer.

(2) Program loading into a computer system, which has been a complicated operation, is automatically accomplished by simply pushing a power switch or load switch. As explained above, when an operator pushes the power switch or load switch, an initial program loader stored in a read-only memory is performed, and a series of programs including a bootstrap, a loader, and a system program are read from the input medium designated by the status of the auxiliary switch.

(3) As the mini-board sheet is provided, when a foreigner having a particular mother tongue uses the present apparatus, he can use the same just by changing the mini-board sheet printed in his mother language.

(4) The function of the lamps, the instruction keys, and function keys of the mini-board panel is defined by a program. Therefore, each lamp and/or key can have a different function just by changing the program. This reduces the necessary number of lamps and keys.

(5) The input apparatus and the output apparatus can be selected simply by the setting of the auxiliary switches, thus, the operation of the apparatus is considerably simplified. In the prior art, the designation of an input apparatus and/or an output apparatus is accomplished by providing information to the operating system of a computer system, and sometimes, a system program must be changed according to the combination of the input/output apparatuses. Thus, the operation of a prior computer system is very complicated.

(6) The present apparatus can be used as an ordinary computer system just by providing the operation panel of the processor.

From the foregoing it will now be apparent that a new and improved NC tape producing system has been found. It should be understood of course that the embodiment disclosed is merely illustrative and is not intended to limit the scope of the invention. Reference should be made to the appended claims, therefore, rather than the specification as indicating the scope of the invention.

What is claimed is:

1. An NC tape producing system comprising
   (a) a desk type cabinet having a top board and a leg portion supporting said top board,
   (b) a general purpose digital processor together with a memory and an initial program loader stored in a read-only memory, mounted in said leg portion of said cabinet,
   (c) a printer, a keyboard panel, a tape input unit and a tape output unit mounted on said top board, and connected to said processor through an input/output control unit,
   (d) said keyboard panel having a keyboard with a plurality of character keys, a plurality of auxiliary switches connected to said processor, a power switch for controlling the power supply to the present NC tape producing system, and a mini-board panel,
   (e) said mini-board panel having a plurality of guidance lamps connected to said processor, a plurality of instruction keys connected to said processor to interrupt the same, and a plurality of function keys connected to said processor, and
   (f) a mini-board sheet with a plurality of holes for covering said mini-board panel to indicate the role of each key.

2. An NC tape producing system according to claim 1, wherein each of said function keys is a hold type switch which, when pushed, remains engaged until pushed again.

3. An NC tape producing system according to claim 1, wherein said auxiliary switches are covered.

4. An NC tape producing system according to claim 1, further comprising a program tape having a system program for translating an NC source program to an NC machine language program, said program tape being punched on a paper tape, and said program tape being arranged to be read in said memory by said initial program loader through said tape input unit under the control of said processor.

5. An NC tape producing system according to claim 1, further comprising a bus line for connecting an outside peripheral device to said processor.

* * * * *